United States Patent [19]
Kaneda et al.

[11] Patent Number: 5,990,977
[45] Date of Patent: Nov. 23, 1999

[54] PICTURE SWITCHING APPARATUS FOR EXECUTING A FADE-OUT/FADE-IN PROCESSING

[75] Inventors: Isami Kaneda; Yasuo Itoh, both of Kanagawa-ken, Japan

[73] Assignee: Victor Company of Japan, Ltd., Yokohama, Japan

[21] Appl. No.: 08/845,705

[22] Filed: Apr. 25, 1997

[51] Int. Cl.[6] .................................................. H04N 9/74
[52] U.S. Cl. ........................... 348/595; 348/705; 348/590
[58] Field of Search ................................ 348/595, 593, 348/584, 590, 705, 706, 239; H04N 9/74

[56] References Cited

U.S. PATENT DOCUMENTS 5,282,037  1/1994  Eguchi .
5,600,370  2/1997  Furuyama ............................. 348/595

Primary Examiner—Sherrie Hsia
Attorney, Agent, or Firm—Michael N. Meller; Eugene Lieberstein

[57] ABSTRACT

A picture switching apparatus for executing a fade-out/fade-in processing between adjacent video recording files includes a multiplier for multiplying a decoded video data with a multiplication coefficient (1−km), a multiplier for multiplying an output data of a data output circuit with a multiplication coefficient km and a data synthesizer for summing results of multiplication from the respective multipliers. The picture switching apparatus thus constructed performs the fade-out/fade-in processing without modification of the original video data for fading processing, by controlling km at the junction between the files such that the mining ratio of the color data for fading to a decoded color data is gradually increased/decreased.

3 Claims, 7 Drawing Sheets

A: PICTURE OF FILE(Fp)

B: PICTURE OF FILE(Fs)

PICTURE SWITCHING APPARATUS FOR EXECUTING A FADE-OUT/FADE-IN PROCESSING

BACKGROUND OF THE INVENTION

1. Field of the Invention

The present invention relates to a picture switching apparatus and, particularly, to a picture switching apparatus for use in a picture display system which reads video data from a recording medium such as a video CD (compact disc) or a photo CD recorded with coded and compressed video data in file unit and decodes and plays it, for executing a fade-out/fade-in processing at a juncture between accesses to files.

2. Description of the Related Art

An AV (audio-visual) system capable of simultaneously reproducing a picture and sound from a video CD or a photo CD which is a variation of an audio dedicated CD has recently being popularized as a Karaoke system, etc.

Further, in concomitance with the era of true multi-media, the DVD (digital video disc) standards have been set and various AV systems compatible with the DVD have being developed.

Video data of respective scenes and sound data corresponding to the respective scenes are compressed by the MPEG (Moving Picture Experts Group) system and recorded in discrete files of such disc and, when the video data is to be reproduced by an AV system, the video data is reproduced by accessing the respective files successively or selectively and decoding a data stream of the video data thus read out.

Since, in the above mentioned system, the access is executed in file unit, a scene related to a file is abruptly displayed on a screen having a picture of a scene related to a preceding being disappeared due to completion of reproducing and display of the scene, resulting in a very unnatural switching of scene.

Although the problem of unnaturalness of scene switching may be solved by employing in a header portion and an end portion of each file coded video data obtained by fade-out processing and a fade-in processing, respectively, the fade-in and fade-out processing of an original video data in every file is very complicated and requires a modification of the original video data.

When a search mode is instructed for a specific file assigned, an operation of the system is shifted to an access of the specific file after an access to a preceding file which is currently being played is ended in the course of a playing. Therefore, while a picture related to a next file is played through the fade-in processing, the picture of the file which is currently being played is ended suddenly.

SUMMARY OF THE INVENTION

In order to solve the above mentioned problems, an object of the present invention is to provide a picture switching apparatus which is used in a picture display system for the video CD or photo CD mentioned above and which always plays a picture of a file through a fade-in processing after a picture of a file which is currently being played is faded-out regardless of the timing of an instruction of file selection and without necessity of modifying an original video data.

Another object of the present invention is to provide a picture switching apparatus for use in a picture display system which selects one of a plurality of files recorded with coded video data, reads the video data from the selected file, decodes the read out coded video data and reproduces and plays it, for switching a picture of a file which is currently being played to a picture of the selected file according to a selection instruction from an operating portion or a selection instruction which is a control data contained in a data stream of the video data.

A further object of the present invention is to provide a picture switching apparatus for use in a picture display system which selects one of a plurality of files recorded with coded video data, reads the video data from the selected file, decodes the read out coded video data and reproduces and plays it, the picture switching apparatus being characterized by comprising data producing means for producing a video data for fading, fade-out condition setting means for setting a fade-out time and a maximum mixing ratio of the video data for fading to the decoded video data, data synthesizing means capable of summing the decoded video data and the video data for fading from the data producing means while changing a mixing ratio of the video data for fading to the decoded video data and fade-out control means responsive to the selection instruction for controlling the data synthesizing means to gradually increase the data mixing ratio of the data synthesizing means from 0 to the maximum mixing ratio within the fade-out time set in the fade-out condition setting means.

With this construction in which the fade-out control means controls the data synthesizing means to gradually increase the data mixing ratio of the video data for fading to the decoded video data of the decoded video data on the basis of the condition of the time and mixing ratio which are set by the fade-out condition setting means regardless of a timing of the selection instruction of the picture switching, it is possible to fade out and end the picture which is currently being played. The fade-out condition setting means may be means which can arbitrarily set the condition from an external operating portion or means which contains conditions set internally and preliminarily and uses one of them fixedly. Further, it is possible to make one of the conditions set by the fade-out condition setting means fixed and the other condition arbitrarily settable.

A further object of the present invention is to provide a picture switching apparatus for use in a picture display system which selects one of a plurality of files recorded with coded video data, reads the video data from the selected file, decodes the read out coded video data and reproduces and plays it, the picture switching apparatus being characterized by comprising data producing means for producing a video data for fading, fade-in condition setting means for setting a fade-in time and a maximum mixing ratio of the video data for fading to the decoded video data, data synthesizing means capable of summing the decoded video data and the video data for fading from the data producing means while changing a mixing ratio of the video data for fading to the decoded video data, detection means for determining whether or not a decoding of an initial frame data or field data of the coded video data of the file selected according to the selection instruction is completed and fade-in control means for controlling the data synthesizing means to gradually decrease the data mixing ratio of the data synthesizing means from the maximum mixing ratio to 0 within the fade-in time set in the fade-in condition setting means when a completion of the decoding is detected by the detection means.

With this construction in which the fade-in control means controls the data synthesizing means to gradually decrease the data mixing ratio of the video data for fading to the decoded video data of the decoded video data on the basis of the condition of the time and mixing ratio which are set by the fade-in condition setting means at a time when the completion of decoding of the initial frame data or field data of the selected file is confirmed by the detection means, it is possible to fade in and display the picture of the selected file.

Another object of the present invention is to provide a picture switching apparatus for use in a picture display system which selects one of a plurality of files recorded with coded video data, reads the video data from the selected file, decodes the read out coded video data and reproduces and plays it, the picture switching apparatus being characterized by comprising data producing means for producing a video data for fading, fade-out condition setting means for setting a fade-out time and a maximum mixing ratio of the video data for fading to the decoded video data, data synthesizing means capable of summing the decoded video data and the video data for fading from the data producing means while changing a mixing ratio of the video data for fading to the decoded video data, fade-out control means responsive to the selection instruction for controlling the data synthesizing means to gradually increase the data mixing ratio of the data synthesizing means from 0 to the maximum mixing ratio within the fade-out time set in the fade-out condition setting means, fade-in condition setting means for setting a fade-in time, detection means for determining whether or not a decoding of an initial frame data or field data of the coded video data of the file selected according to the selection instruction is completed and fade-in control means for controlling the data synthesizing means to gradually decrease the data mixing ratio of the data synthesizing means from the maximum mixing ratio controlled by the fade-out control means to 0 within the fade-in time set in the fade-in condition setting means when a completion of the decoding is detected by the detection means.

With this construction, it is possible to automatically use the maximum mixing ratio of the decoded video data for fading which was executed in the fade-out processing related to the picture of the preceding file and fade-in the next picture from the maximum mixing ratio and display the next picture within the fade-in time set in the fade-in condition setting means. That is, it is possible to continuously execute the fade-out processing of the picture of the preceding file and the fade-in processing of the picture of the next file while arbitrarily setting respective processing times and to make states of the picture (fade states) at the time of completion of fade-out processing and the time of start of fade-in processing the same.

DETAILED DESCRIPTION OF THE PREFERRED EMBODIMENTS

Figure 1:
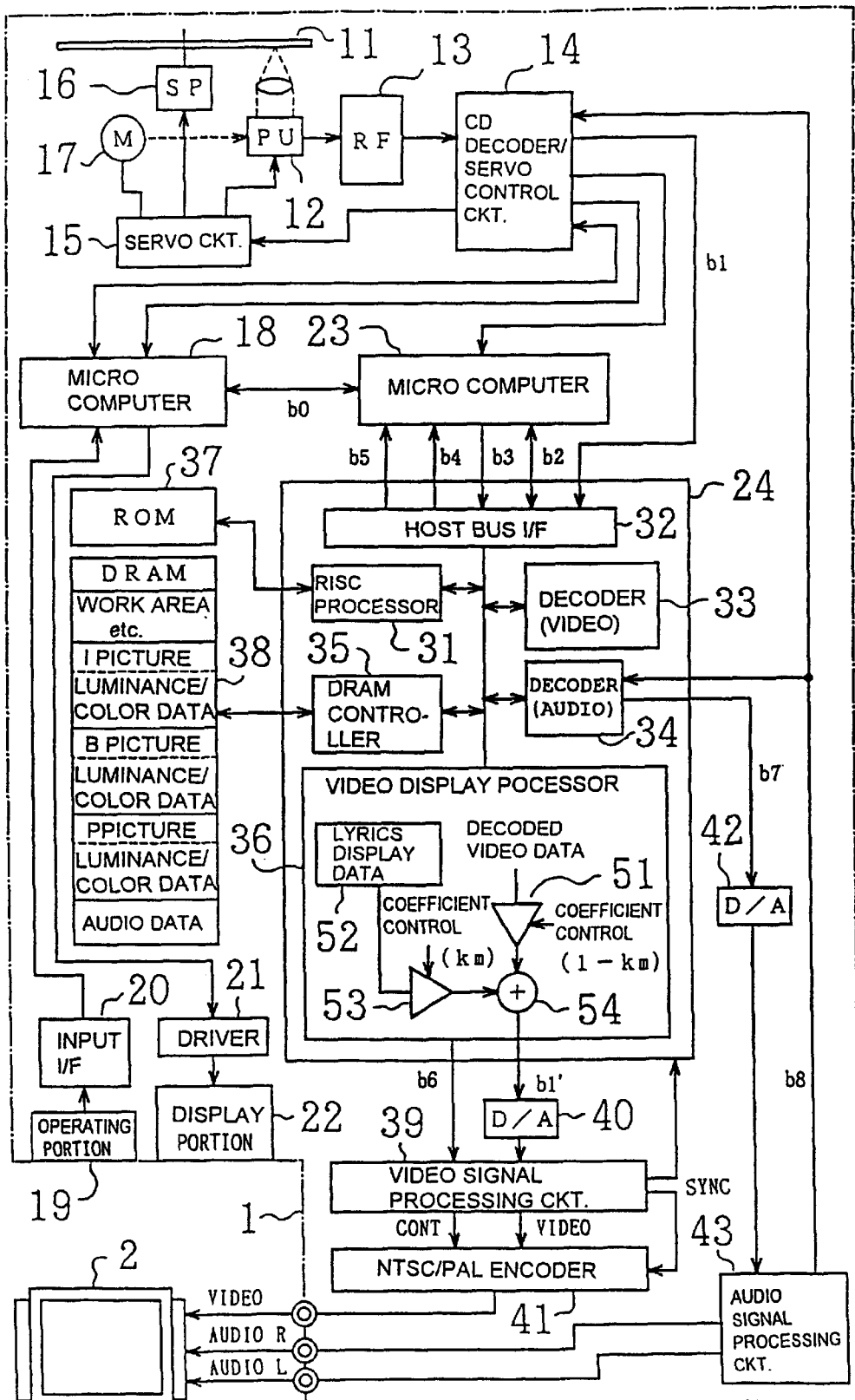
FIG. 1 shows a circuit diagram of a video/audio reproducing system using a video CD, according to a first embodiment of a picture switching device of the present invention.

A first embodiment of the picture switching device according to the present invention will be described in detail with reference to the drawings. FIG. 1 shows a system circuit diagram of a video/audio reproducing system using a video CD. In FIG. 1, reference numerals 1 and 2 denote a player and a monitor having a display, an audio reproducing circuit and a loudspeaker, respectively. Basic operations of the player 1 and respective units thereof will be described briefly.

Video data and associated audio data which are coded according to the MPEG1 system and are different every file are recorded on a video CD 11. That is, the video data is composed of an I (intra-coded) picture whose coding is completed within a flame, a P (predictive coded) picture which performs a prediction from a preceding frame and a B (bidirectionally predictive coded) picture which performs a prediction from a preceding and succeeding frames, based on the frame structure of the MPEG system and constitutes a GOP (group of pictures) in time axis prediction mode with 24 to 30 frames [I,B,B,P,B,B, . . . , P,B,B,P]. Each picture includes a luminance data and a color data which are coded separately.

The audio data has been coded according to an adaptive bit assigning processing system (MPEG1; layer I) using the sub-band coding processing and an auditory characteristics.

The coded video data and the audio data recorded on the video CD 11 are read out by means of an optical pick-up 12 and a signal obtained is input to a CD decoder/servo control circuit 14 after amplified by an RF amplifier 13.

The CD decoder/servo control circuit 14 decodes an EFM (eight to fourteen modulation) signal obtained from the RF amplifier 13 and reads a sub-code data. Further, the CD decoder/servo control circuit 14 outputs a control signal related to a spindle rotation speed and a tracking focus of the optical pick-up 12 to a servo circuit 15. The servo circuit 15 responds to the control signal to execute a rotation control and a focus control of a spindle motor 16 and a tracking motor 17.

A micro computer circuit 18 stores data read from a TOC (table of contents) of the video CD 11 in its internal memory and takes the sub-code data to control the CD decoder/servo control circuit 14 according to a control command input from an operating portion 19 through an input I/F 20 to output a status information, etc., through a driver 21 to a display portion 22 to display the information, etc., thereon.

A micro computer circuit 23 is connected to a video CD decoder 24 through a data bus b2 for transmitting a mode information and acquiring the status information indicative of a program processing status in the video CD decoder 24, a data bus b3 for transmitting a signal for controlling an exchange of data address information and the video CD decoder 24, a data bus b4 for acquiring an information of data stream input to the video CD decoder 24 and a data bus b5 for acquiring an audio status information from the video CD decoder 24. Further, the micro computer circuit 23 is connected to the micro computer circuit 18 through a data bus b0 for receiving the control command and transmitting the status information. With the above mentioned construction, the micro computer circuit 23 controls the whole system including the video CD decoder 24.

The video CD decoder 24 includes an RISC (reduced instruction set computer) processor 31, a host bus I/F 32, a video data decoder 33, an audio data decoder 34, a DRAM (Dynamic Random Memory) controller 35 and a VD (video display) processor 36 all of which are mutually connected through a bus.

The RISC processor 31 is adapted to control the internal units 32 to 36 and execute, in a decoding operation, a decoding of MPEG1 syntax and arithmetic operations of 2-dimensional DCT (discrete cosine transform), inverse quantization and movement vector, etc., by reading a basic program stored in an external ROM (Read Only Memory) 37.

The host bus I/F 32 acquires the coded video data and the coded audio data of the video CD 11 from the CD decoder/servo control circuit 14 through the bus b1 and executes exchange of the various information through the micro computer 23 and the buses b2 to b5.

The DRAM controller 35 writes the coded video data and the coded audio data acquired through the bus b1 in an external DRAM 38 and outputs the video data decoded by the video data decoder 33 to the VD processor 36. Further, the DRAM controller 35 reads the coded audio data in the DRAM 38 and outputs it to the audio data decoder 34. Incidentally, the DRAM 38 has, in addition to buffer areas for storing the respective pictures (I pictures, B pictures and P pictures) and an audio data storing area, a late buffer area and a work area which is used by the RISC processor 31.

The video data decoder 33 decodes variable length coded data of the respective pictures written in the DRAM 38 and decode luminance data and color data of the respective pictures in cooperation with the function of the RISC processor 31.

The audio data decoder 34 decodes the coded audio data written in the DRAM 38 in cooperation with the RISC processor 31.

The VD processor 36 assembles the decoded video data as a data set, outputs the data set to a bus b1' and outputs the control signal to the bus b6. The VD processor 36 includes a fade-out/fade-in processing circuit to be described later therein.

The video signal processing circuit 39 receives the decoded video data from the VD processor 36 through the bus b1' and a D/A converter 40 and the control signal through the bus b6, converts RGB signals, the luminance signal and the color signal into a composite signal and sends the composite signal to an NTC/PAL encoder 41.

The NTSC/PAL encoder 41 converts the composite signal into a video signal of the NTSC system or the PAL system and outputs the video signal to the monitor device 2.

On the other hand, in the audio system, an audio signal processing circuit 43 receives the audio data decoded by the audio decoder 34 of the video CD decoder 24 from a bus 7 through a D/A converter 42, processes it in a predetermined manner and outputs it to the monitor device 2. Incidentally, a bus b8 is used to transmit the status information of the audio signal processing circuit 43 to the audio decoder 34 and the CD decoder/servo control circuit 14.

In the video/audio reproducing system mentioned above, this embodiment is featured in the following points:

(1) The fade-out/fade-in processing circuit is provided in a data output portion of the VD processor 36 in the video CD decoder 24.

In concrete, the fade-out/fade-in processing circuit comprises a multiplier 51 for multiplying the decoded video data with a variably controlled multiplication coefficient 1−km, a data output circuit 52 for outputting a lyrics display data, a multiplier 53 for multiplying an output data of the data output circuit 52 with a variable controlled multiplication coefficient km and a data synthesizer 54 for summing outputs of the respective multipliers 51 and 53. An output of the data synthesizer 54 is supplied through the bus b1' to the D/A converter 40.

(2) A fade-out/fade-in processing condition can be set by setting a parameter input mode in the operating portion 19.

(3) The fade-out/fade-in processing condition is stored in the micro computer circuit 23 through the micro computer circuit 18. The micro computer circuit 23 supplies the processing condition to the video CD decoder 24 with a predetermined timing and the VD processor 36 controls the fade-out/fade-in processing circuit on the basis of the processing condition.

Now, an operation of the fade-out/fade-in processing which is one of the features of this embodiment will be described with reference to flowcharts shown in FIGS. 2 to 4.

Figure 2:
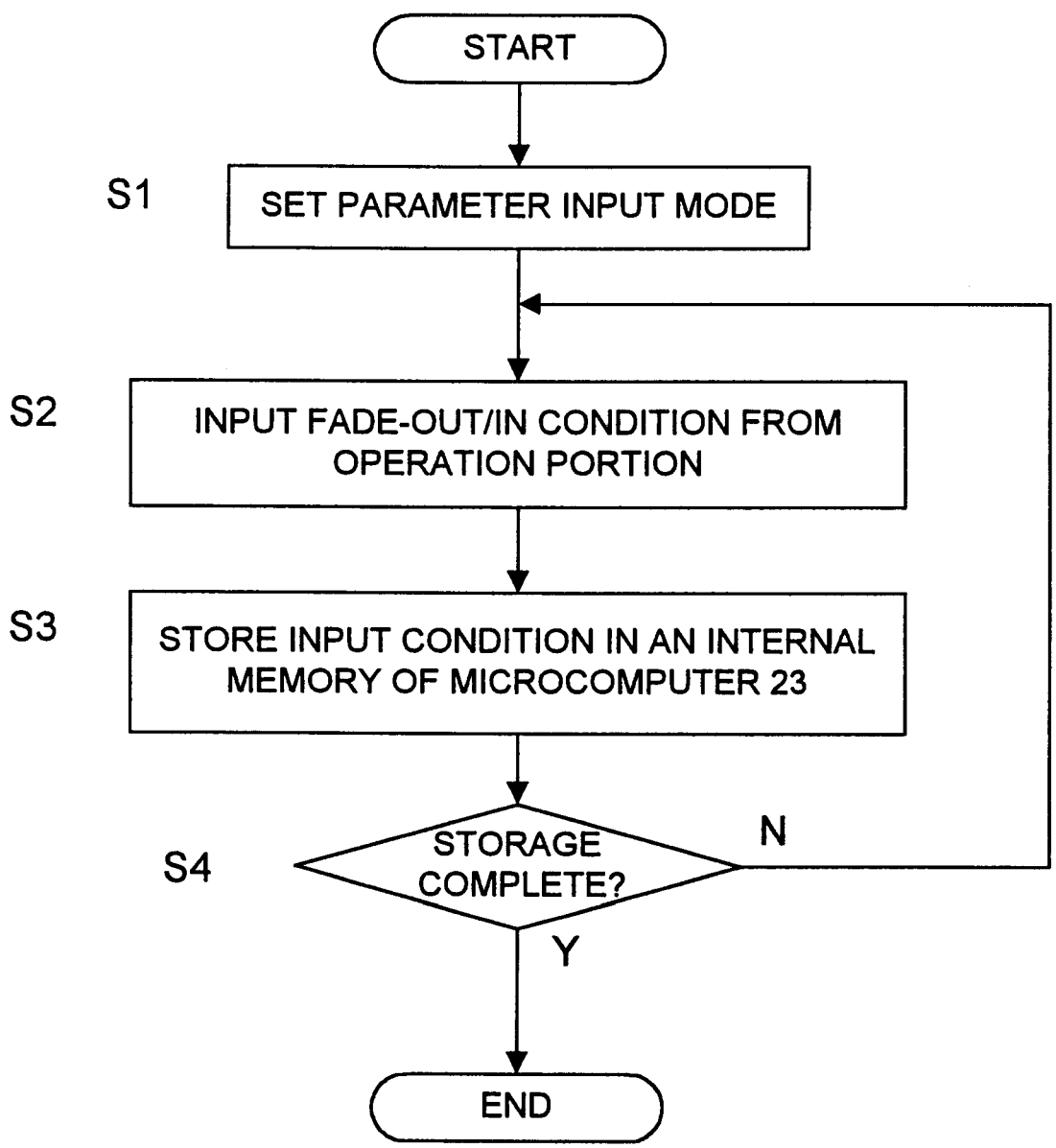
FIG. 2 is a flowchart showing an operation of the system when fade-in/fade-out processing conditions are set.

FIG. 2 is a flowchart showing an operation for setting the fade-out/fade-in processing condition.

When the parameter input mode is set by the operating portion 19 of the player 1, the micro computer circuit 18 notifies the parameter input mode to the micro computer circuit 23 to make the latter in the parameter setting mode (S1).

When, in this mode, the fade-out/fade-in processing condition is input from the operating portion 19, the input condition is transferred from the micro computer circuit 18 to the micro computer circuit 23 and is stored in an internal memory of the micro computer circuit 23 (S2–S4).

In this embodiment, MIX RATIO: 0–4 and SLOPE: 0–3 shown in Tables 1 and 2 are prepared as the fade-out/fade-in processing condition.

TABLE 1 mixing ratio of lyrics display data to
respective color data of respective frame km

| MIX RATIO: 0 | 0/4 | 0.00 |
| MIX RATIO: 1 | 1/4 | 0.25 |
| MIX RATIO: 2 | 2/4 | 0.50 |
| MIX RATIO: 3 | 3/4 | 0.75 |
| MIX RATIO: 4 | 4/4 | 1.00 |

TABLE 2

| SLOPE: 0 | fade-in/fade-out to assigned MIX RATIO immediately |
| SLOPE: 1 | fade-in/fade-out to MIX RATIO assigned in 15 fields |
| SLOPE: 2 | fade-in/fade-out to MIX RATIO assigned in 30 fields |
| SLOPE: 3 | fade-in/fade-out to MIX RATIO assigned in 45 fields |

"MIX RATIO: 0–4" are indices indicative of maximum mixing ratios of lyrics display data to the respective color data of the respective frames in mixing the lyrics display data with the color data of respective pictures of the decoded video data as shown in Table 1 and "SLOPE: 0–3" are indexes indicative of the number of frames within times corresponding thereto the fade-in/fade-out processing is completed.

For example, by inputting FADE-OUT RATIO: 3, SLOPE: 1)/FADE-IN (MIX RATIO: 0, SLOPE: 2), a condition that "a fade-out processing control is executed such that the mixing ratio of the lyrics display data is gradually increased from 0 to 3/4 within a time corresponding to 15 fields from a start of the fade-out processing and a fade-in processing control is executed such that the mixing ratio of the lyrics display data is gradually decreased from 3/4 to 0 within a time corresponding to 30 fields from a start of the fade-in processing" is set.

Further, in this embodiment, it is possible, in order to simplify the input command and the sequence, to combine the fading processing and a play command of a next file and assign the processing by only a control item related to SLOPE, for example, FADE-IN PLAY (SLOPE: 1, SLOPE: 2).

In such case, a condition that "a fade-out processing control is executed under a condition of the maximum mixing ratio of the lyrics display data fixed to MIX RATIO: 4 and a time condition of SLOPE: 1 and a fade-in processing control is executed under a time condition of SLOPE: 2 at a play start of a next file" is set.

Incidentally, in this embodiment, a color of the lyrics display data can be assigned from the operating portion 19. When there is no assignment of color, the lyrics is displayed in black color and when a certain color is assigned, the lyrics is displayed in the assigned color.

Figure 3:
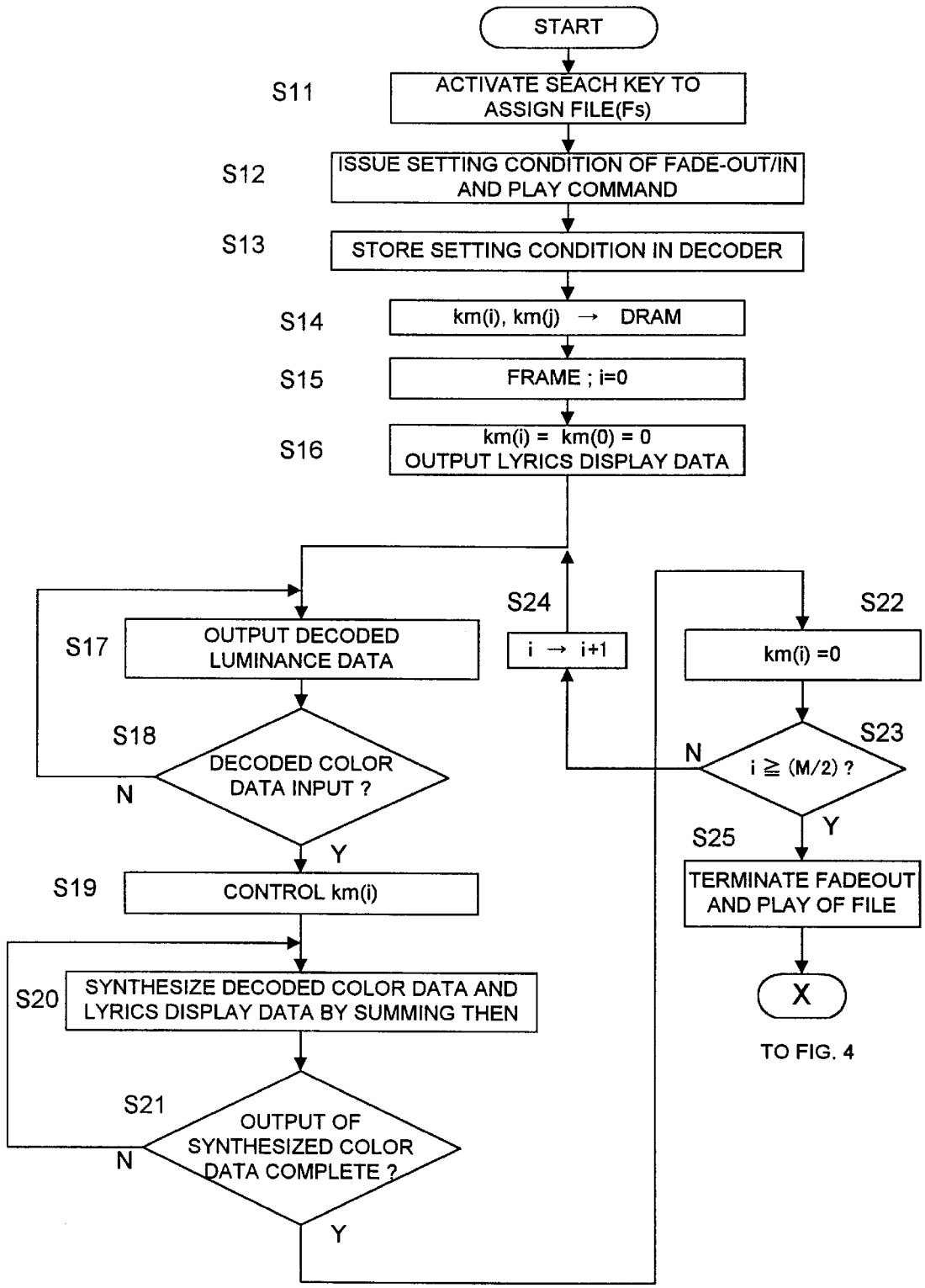
FIG. 3 is a flowchart showing an operation of the fade-out processing in the first embodiment.
Figure 4:
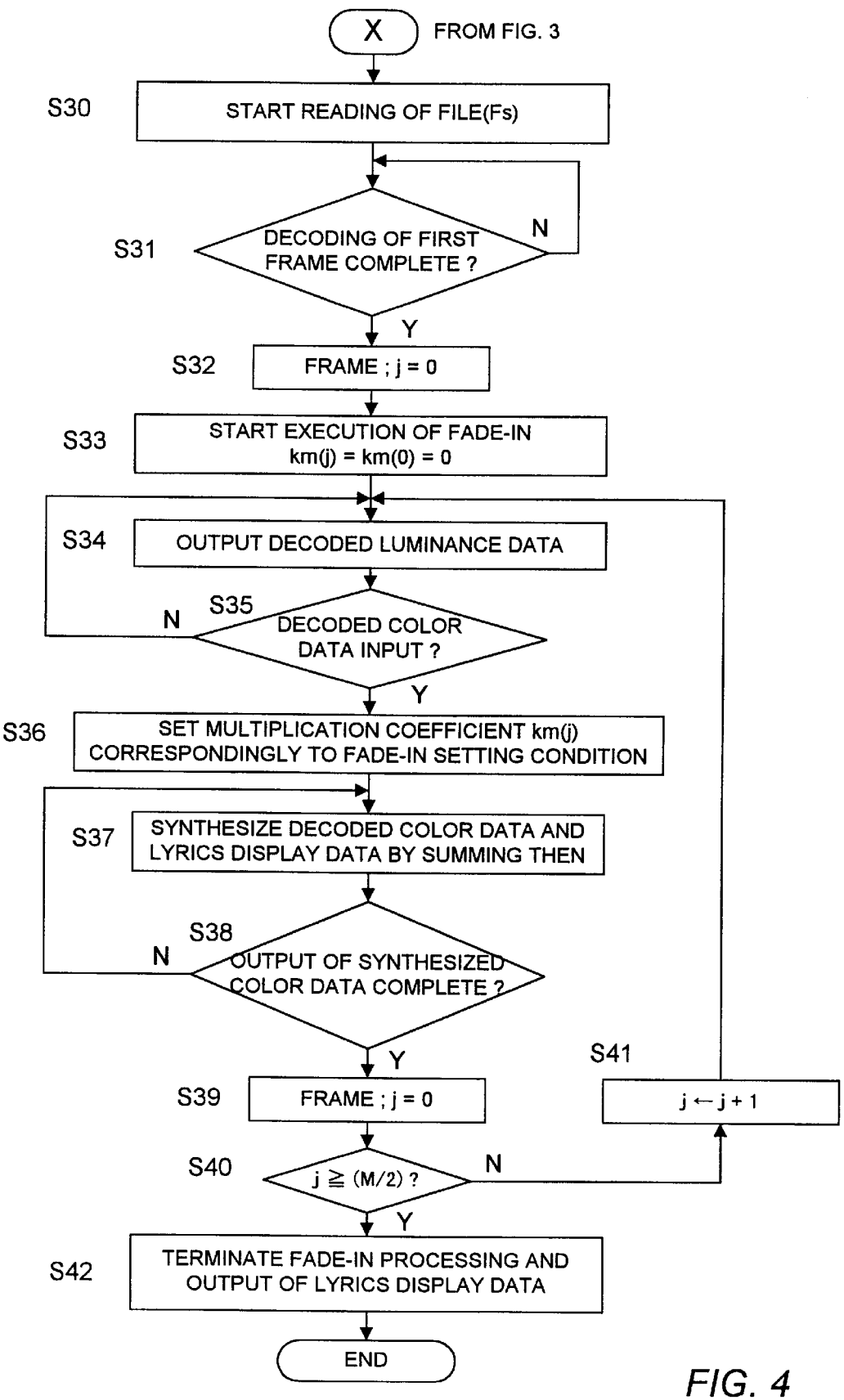
FIG. 4 is a flowchart showing an operation of the fade-in processing in the first embodiment.

FIGS. 3 and 4 show a flowchart of an operation of the video/audio reproducing system of this embodiment when a fade-out/fade-in processing is performed practically.

In this case, the fade-out/fade-in processing condition is preliminarily set as FADE-IN PLAY (SLOPE: 1, SLOPE: 2) and it is assumed that, during the player 1 is playing a file (Fp) of the video CD 11, a search mode assigning a file (Fs) thereof is instructed from the operating portion 19.

First, when a search key of the operating portion 19 which assigns the file (Fs) is pushed, the micro computer circuit 23 issues the above mentioned command FADE-IN PLAY (SLOPE: 1, SLOPE: 2) to the video CD decoder 24 and the video CD coder 24 stores the command in the work area of the DRAM 38 (S11–S13).

The video CD coder 24 arithmetically operates the time series control data of km(i)[i=1–M/2] and km(j)[j=1–N/2] which determine the multiplication coefficients (1–km) and km of the multipliers 51 and 53 of the VD processor 36 immediately on the basis of the time information (M=15 fields/N=30 fields) of the fade-out/fade-in assigned by the previously mentioned command and the maximum mixing ratio (4/4) of the lyrics display data and stores the control data in the work area of the DRAM 38 (S14), where i is the number of frames after a start of the fade-out processing and j is the number of frames after a start of the fade-in processing.

When the storage of the control data in the DRAM 38 is completed, an execution of the fade-out processing of a picture data of the file (Fp) on play is started to set km(0)=0 as an initial value of km(i) and the lyrics display data is output by activating the data output circuit 52 (S15, S16).

The micro computer circuit 18 confirms the status information (the set condition of the fade-out processing) of the video CD decoder 24 through the data buses b2 and b5 and the micro computer circuit 23 and sends a control data for reading the GOP constituting a coded picture data corresponding to M/2 frames from the file (Fp) after the start of the fade-out processing to the CD decoder/servo control circuit 14.

The coded picture data is read out in time series from the file (Fp) on play. The respective pictures of the MPEG system are written in corresponding frame buffers of the DRAM 38, decoded by the video decoder 33 and output to the VD processor 36. Since the luminance data and the color data of each picture are separated even after decoded and constitute a decoded picture data corresponding to 1 frame, the fade-out processing is executed by controlling the fade-out/fade-in processing circuit of the VD processor 36 in the following manner:

First, in response to the decoded luminance data of the picture input, the VD processor 36 sets the value of km(i) which determines the multiplication coefficients (1–km) and km of the multipliers 51 and 53 to 0 and outputs the decoded luminance data as it is (S16→S17, S22, S23→S17).

Then, in response to the decoded color data of the picture, the VD processor 36 immediately sets km(i) to the value corresponding to the number (i) of the frames after the start of the fade-out processing on the basis of the control data set in the step S14 (S18, S19). That is, since, in this case, the operation is the same as in the case where FADE-OUT[M RATIO: 4, SLOPE: 1] is set, km(i) is set to (1/8)i.

Therefore, the multiplication coefficient [1–km(i)] of the multiplier 51 becomes [(8–i)/8] and the multiplication coefficient [km(i)] of the multiplier 53 becomes [i/8]. Consequently, the decoded color data of the initial frame (i=0) after the start of the fade-out processing is output from the data synthesizer 54 as it is and the decoded color data of the i-th frame is mixed with the lyrics display data at a ratio of [i/8] and output to the data synthesizer 54 (S20).

When the output of the color data is completed, the decoded luminance data of a next picture is input to the VD processor 36. Therefore, the value of m(i) is made back temporarily to 0 and the decoded luminance data with m(i) being 0 is output as it is (S21, S22–S24→S17). Then, in the step in which the decoded color data is input to the VD processor 36, km(i+1) is set on the basis of the control data, the lyrics display data is mixed to the decoded color data with a ratio of [(i+1)/8] in the sata synthesizer 54 (S18–S21).

As a result, the decoded luminance data of the respective pictures are output as they are and the lyrics display data are mixed to the decoded color data of the frames after the start of the fade-out processing with the ratios of 0, 1/8, 2/8, 3/8, . . . by repeating the above procedures respectively. That is, a picture of the file (Fp) displayed on the monitor device 2 through the video signal processing circuit 39 and the NTSC/PAL encoder 41 is gradually faded by the color of the lyrics display data.

The fade-out processing is terminated in a step in which the number (i) of the frames becomes M/2 (in this case, 8(≧15/2) frames]) on the basis of the setting condition of SLOPE: 1. In this step, the play of the file (Fp) is also terminated (S23→S25).

In this step, the mixing ratio of the lyrics display data to the decoded color data is 1 (=4/4) and the display screen of the monitor 2 is completely faded by the color of the lyrics display data.

When the fade-out processing is completed through the above mentioned steps, the micro computer circuit 23 sends the status information received from the video CD decoder 24 to the micro computer circuit 18 and instructs it to start a reading of the file (Fs). The micro computer circuit 18 notifies the CD decoder/servo control circuit 14 the instruction and a reading of the file (Fs) from the video CD 11 is started (S30).

A coded video data and a coded audio data of the file (Fs) thus read out are transferred to the video CD decoder 24, written in the DRAM 38 and decoded by the respective decoders 33 and 34. At a time when the decoding of the first frame (I picture) is completed, the execution of the fade-in processing is started (S31–S33).

In this step, km(0)=0 is set as an initial value of the coefficient km(j) and the VD processor 36 outputs the decoded luminance data of the first frame as it is (S33, S34).

Then, when the decoded color data of the first frame is read out from the DRAM 38 to the VD processor 36, km(0) is switched to 1 by the control data based on the fade-out setting condition.

Since, therefore, the multiplication coefficients [1−km(0)] and [km(0)] become 0 and 1, respectively, the decoded color data output from the data synthesizer 54 contains only the lyrics display data. Since this state is similar to that at a time when the fade-out processing is completed, the display screen of the monitor 2 related to that frame is completely maintained in the color of the lyrics display data (S35–S38).

On the other hand, when the output of the data of the first frame is completed, km(0) is immediately switched back to 0 and a decoded video data of a second flame is input to the VD processor 36. The fade-out/fade-in processing control for the second and subsequent frames is performed in the following manner:

First, km(j−1) has been switched back to 0 at a time when a data output of a frame (j−1) is completed and so a decoded luminance data of a frame (j) is output as it is similarly to the initial state (S39–S41→S34).

Then, when the decoded color data is input, km(j) is immediately set to a value corresponding to the number (j) of frames after the start of the fade-in processing on the basis of the control data set in the step 14 shown in FIG. 3 (S35, S36). That is, since this case is similar to that when the condition setting is FADE-IN[MIX RATIO: 4, SLOPE: 2], the following setting is made: km(j)=1−(1/15)−j=(15−j)/15.

Since, therefore, the multiplication coefficients [1−km(j)] and [km(j)] of the multipliers 51 and 53 become [(1/15)−j] and [(15−j)/15], respectively, a decoded color data of the initial frame (j=0) after the start of the fade-out processing is output from the data synthesizer 54 as it is, while the decoded color data of a subsequent j-th frame is mixed with the lyrics display data with a ratio [(15−j)/15] and output from the data synthesizer 54 (S36).

By repeating the steps 34 to 41, the decoded luminance data of the respective frames are output as they are and the decoded color data thereof are mixed with the lyrics display data with ratios of 14/15, 13/15, 12/15, . . . in the order of frames after the start of the fade-in processing, respectively. Since the mixing ratio is gradually decreased, a picture on the screen of the monitor 2 displayed through the video signal processing circuit 39 and the NTSC/PAL encoder 41 is a monotone of the complete lyrics display data color and becomes a reproduced picture of the decoded data of the file (Fs) gradually.

The fade-in processing is terminated in a step in which the number (j) of frames becomes N/2 (in this case, 15 frames) on the basis of the setting condition of SLOPE: 2 and the output of the lyrics display data is also terminated in this step (S40→S42).

In this step, the mixing ratio of the lyrics display data to the decoded color data has become 0 (=0/4) and the complete reproduced picture of the file (Fs) is displayed on the display screen of the monitor 2.

Figure 5:
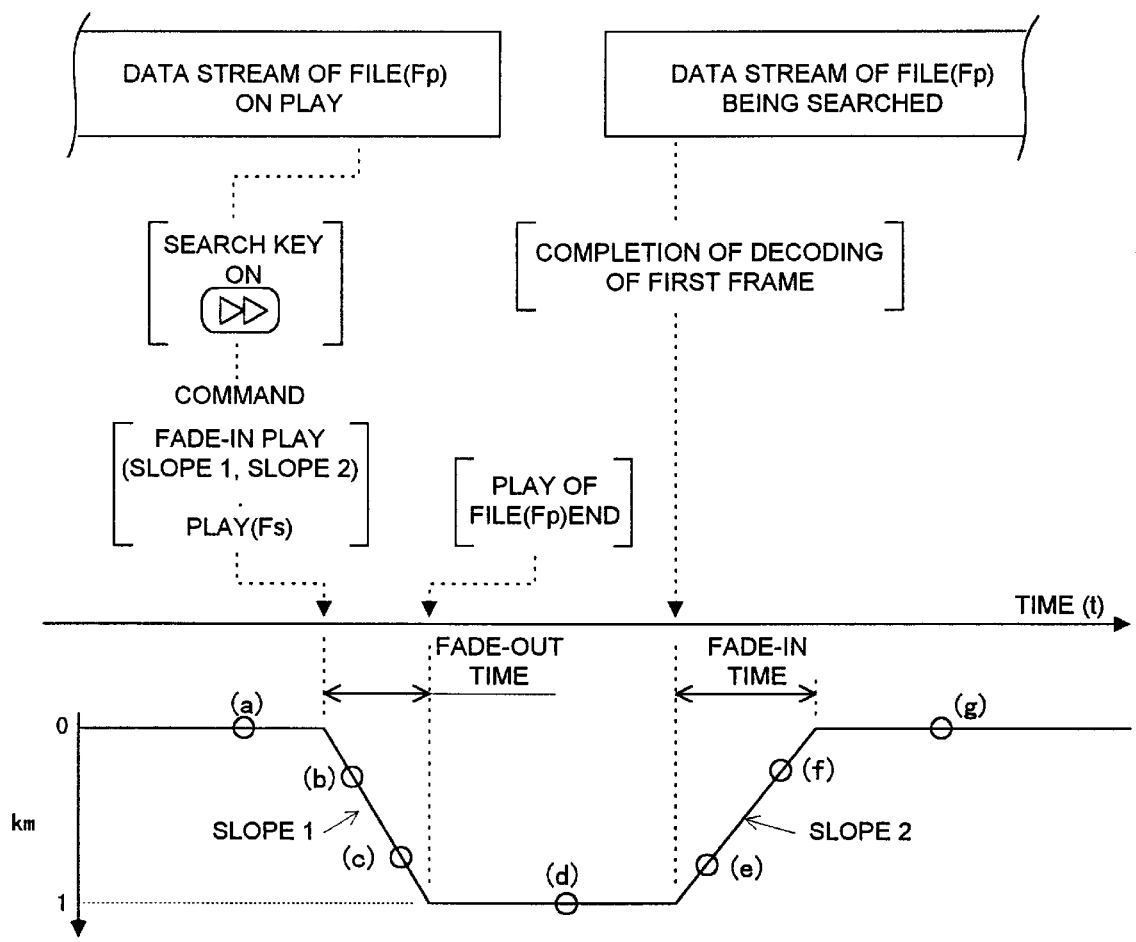
FIG. 5 shows a state of the fade-out/fade-in processing of data streams of a file (Fp) and a file (Fs) in time series.

The fade-out/fade-in processing is terminated through the steps shown in FIGS. 3 and 4. FIG. 5 shows a correspondence between the time-series processing steps and the data streams of the files (Fp) and (Fs).

That is, as shown in FIG. 5, the fade-out processing related to the picture of the file (Fp) is executed under the condition of SLOPE: 1 when the search key of the operating portion 19 is operated. With the completion of the fade-out processing, the play of the file (Fp) is terminated. Thereafter, the play of the file (Fs) is started and the fade-in processing is executed under the condition of SLOPE: 2 from the time at which the decoding of the first frame is completed and the fade-out/fade-in processing is completed.

Figure 6:
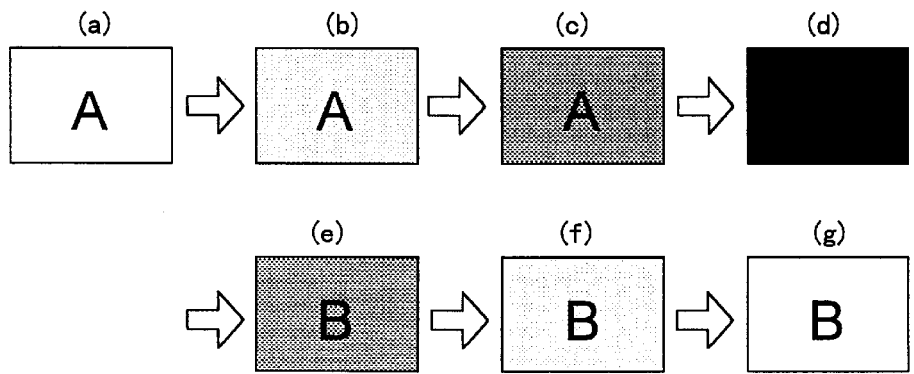
FIG. 6 shows a change of a screen of a monitor due to the fade-out/fade-in processing.

FIG. 6 shows a correspondence between the time-series processing steps and the state of picture on the monitor 2. Incidentally, capital letters A and B in FIG. 6 denote the pictures of the decoded video data of the files (Fp) and (Fs), respectively.

As shown in FIG. 6, by the execution of the fade-out/ fade-in processing, the picture A is gradually faded out by the color of the lyrics display data and the screen becomes the color of the lyrics display data completely temporarily [(a)–(d)]. Then, the picture B is faded in on the screen of the lyrics display data color to display the complete picture B [(d)–(g)]. Therefore, the very natural switching from the picture A to the picture B can be realized, compared with the conventional switching system in which the picture A is abruptly switched to the picture B.

On the other hand, the coded audio data is decoded sequentially by the audio decoder 34 of the video Cd decoder 24 with a timing corresponding to the decoding of the coded video data. The decoded audio data is supplied through the D/A converter 42 to the audio signal processing circuit 43 and resultant audio signals R and L are output from the audio signal processing circuit 43 to the monitor 2. Thus, the monitor 2 reproduces sound corresponding to the picture reproduced and played in time series.

This embodiment has been described by employing the execution of the composite command FADE-IN PLAY (SLOPE: 1, SLOPE: 2) as an example. In a case where the fade-out condition and the fade-in condition are set separately, km is controlled on the basis of these conditions.

In this embodiment, the fade-out/fade-in processing circuit of the VD processor 36 has the construction shown in FIG. 1 and, in order to output the decoded luminance data as it is, km is switched back to 0 every frame through the step S22 shown in FIG. 3 and the step S39 shown in FIG. 4. On the other hand, it may be possible to provide switching means such as a multiplexer on the input side of the multiplier 51 to output the decoded luminance data to the output side of the data synthesizer 54 as it is and input only the decoded color data to the multiplier 51. In such case, although the switching means must be controlled, km can be merely increase/decrease controlled according to the condition setting of the fade-out/fade-in processing.

Further, in this embodiment, the fade-out processing is executed from the operating portion 19 on the basis of the selection instruction of the next file (Fs). On the other hand, it may be possible to insert the file number to be reproduced and displayed next, etc., into an end portion of the data stream of each file. In a case where the sequence of reproducing and display of the files is determined according to the file numbers, the execution of the fade-out processing for a certain file may be performed at a time when a file number thereof is detected.

Although, in this embodiment, the condition setting of the fade-out/fade-in processing is selected from the preliminarily set conditions shown in Tables 1 and 2, it may be possible to construct the system such that these conditions can be set by the operating portion 19.

Now, a second embodiment of the picture switching device according to the present invention will be described.

The picture switching device according to the second embodiment can use in the video/audio reproducing system shown in FIG. 1 as in the first embodiment. Although, in the first embodiment, only the decoded color data is faded-out or faded-in, the fade-out/fade-in processing is performed for both a decoded luminance data and a decoded color data in the second embodiment.

Figure 7:
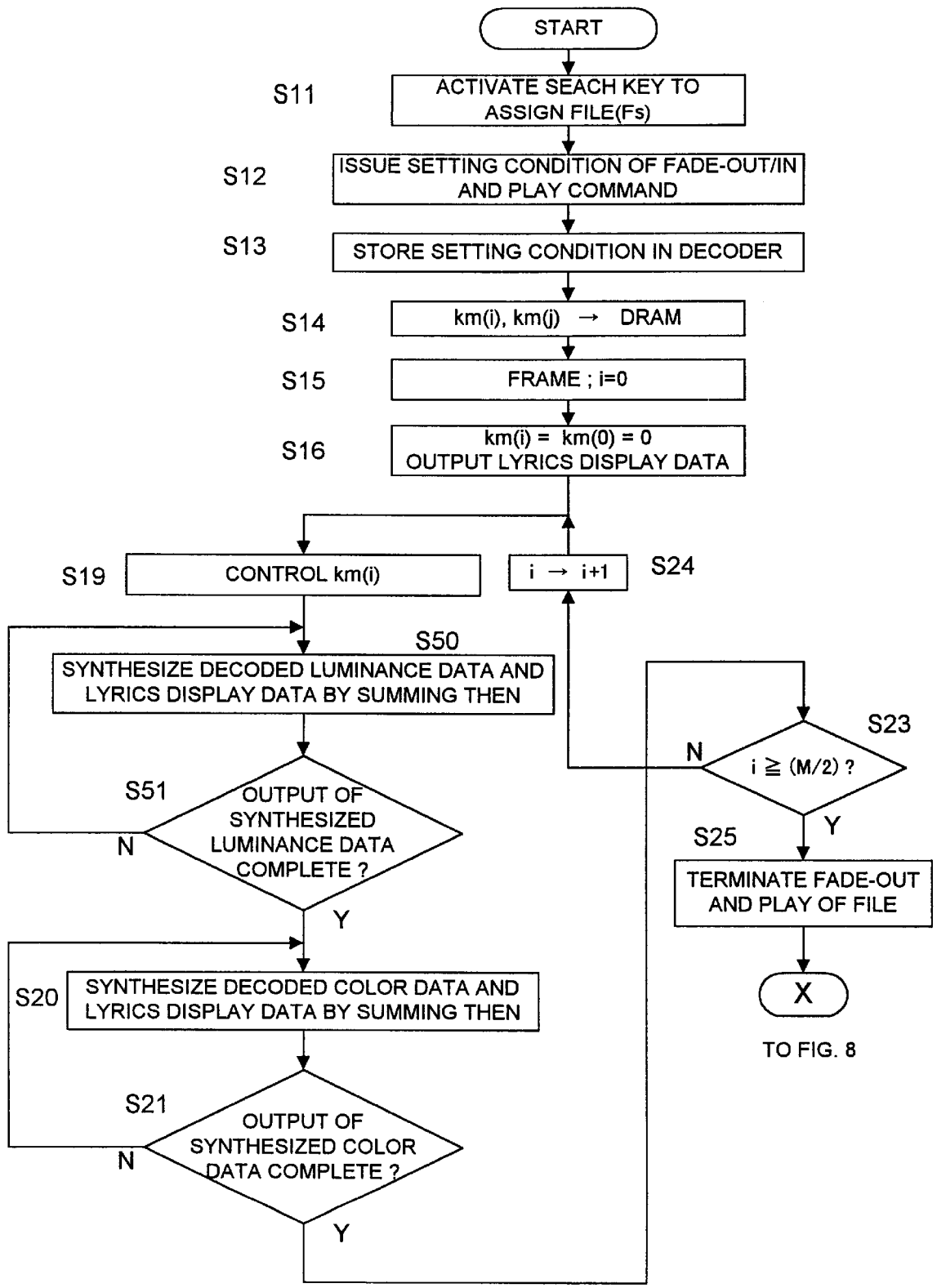
FIG. 7 is a flowchart showing an operation of the fade-out processing in a second embodiment of the picture switching device of the present invention.

FIG. 7 shows a flowchart of a fade-out processing of the picture switching device according to the second embodiment. In the second embodiment, the fade-out/fade-in processing circuit of the VD processor 36 executes a fade-out processing by a following control procedure, in which, since a processing from the steps S11 to S16 and the steps S23 to S25 is the same as that shown in FIG. 3, description thereof is omitted:

First, the VD processor 36 responds to the decoded data of the picture to immediately set km(i) to a value corresponding to the number (i) of frames after the start of the fade-out processing on the basis of the control data set in the step S14 (S19). That is, since this case is similar to the case where the condition is set as FADE-OUT[MIX RATIO: 4, SLOPE: 1], km(i)=(1/8)i is set.

Therefore, the multiplication coefficients [1−km(i)] and [km(i)] of the multipliers 51 and 53 become [(8−i)/8] and [i/8], respectively. Consequently, both the decoded luminance data and the decoded color data of the initial frame (i=0) after the start of the fade-out processing are output from the data synthesizer 54 as they are. For subsequent frames, the decoded color data of the i-th frame is mixed with the lyrics display data at a ratio of [i/8] and output to the data synthesizer 54 (S50). When the output of the luminance data is completed (S51), the decoded color data mixed with the lyrics display data with a ratio [i/8] is output from the data synthesizer 54 (S20, S21).

As a result, the decoded luminance data and the decoded color data are mixed with the lyrics display luminance data and color data with mixing ratio 0, 1/8, 2/8, 3/8, . . . in the order of the frames after the start of the fade-out processing by repeating the above procedures respectively. That is, the screen of the monitor 2 on which a picture of the file (Fp) is displayed on the monitor device 2 through the video signal processing circuit 39 and the NTSC/PAL encoder 41 is gradually changed to a monotone color screen having a predetermined luminance indicated by the lyrics display data.

Figure 8:
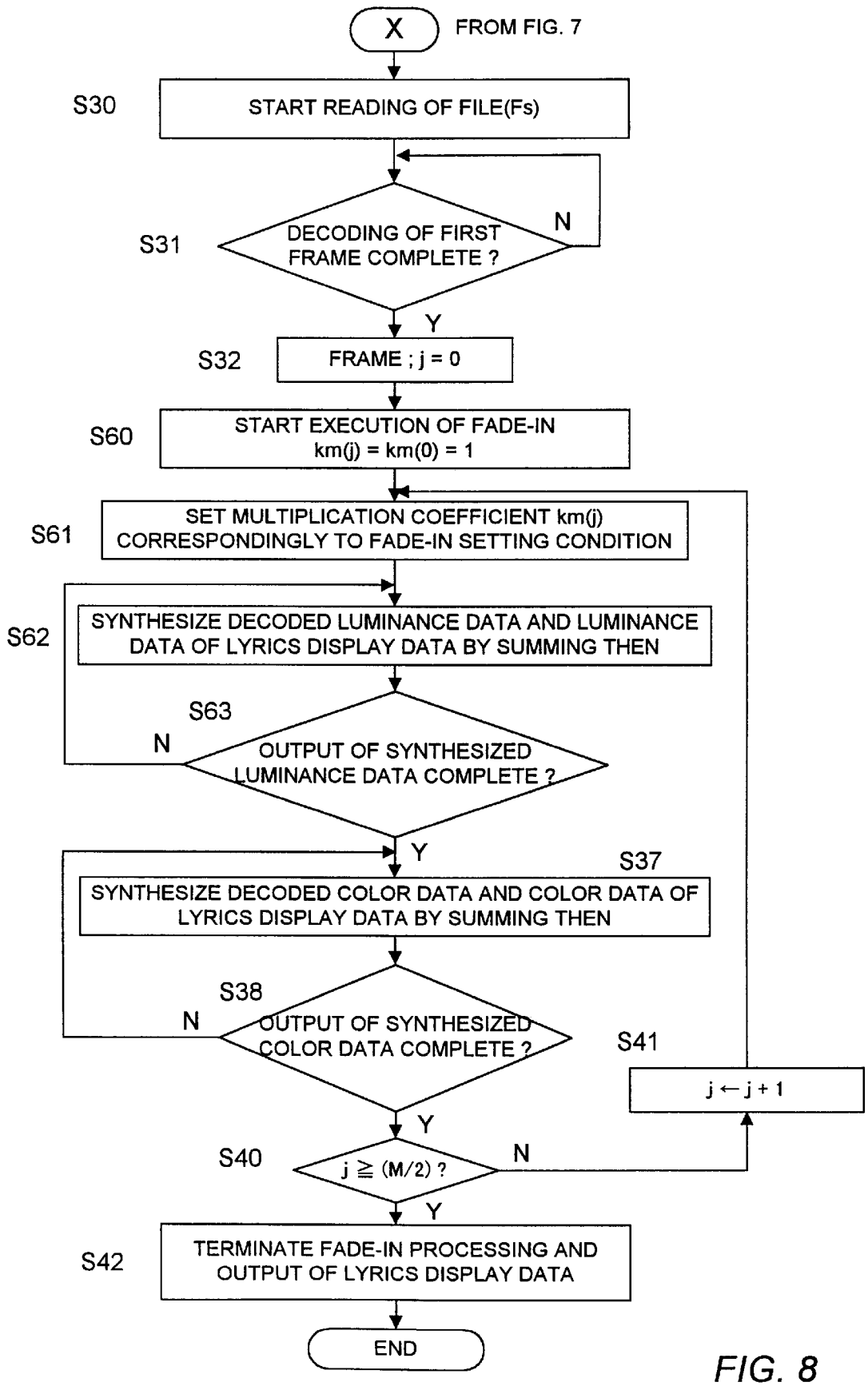
FIG. 8 is a flowchart showing an operation of the fade-in processing in the second embodiment.

FIG. 8 shows a flowchart of the fade-in processing of the picture switching device according to the second embodiment. In the second embodiment, the fade-out/fade-in processing circuit of the VD processor 36 executes a fade-in processing by a following control procedure, in which, since a processing from the steps S30 to S32 and the steps S40 to S42 is the same as that shown in FIG. 4, description thereof is omitted:

At a time when the decoding of the first frame (I picture) is completed, the initial value of km(j) is set to km(0)=1 (S60). Since, therefore, the multiplication coefficients [1−km(0)] and [km(0)] of the multipliers 51 and 53 become 0 and 1, respectively, the decoded video data output from the data synthesizer 54 contains only the lyrics display data. Since this state is similar to that at the time when the fade-out processing is completed, the color and luminance of the display screen of the monitor 2 related to that frame are those of the lyrics display data.

For a second and subsequent frames, the fade-out/fade-in processing circuit is controlled as to be described next. First, when the decoded data is input, km(j) is immediately set to a value corresponding to the number (j) of frames after the start of the fade-in processing on the basis of the control data set in the step 14 shown in FIG. 7 (S61). That is, since this case is similar to that when the condition setting is FADE-IN[MIX RATIO: 4, SLOPE: 2], the following setting is made: km(j)=1−(1/15)−j=(15−j)/15.

Since, therefore, the multiplication coefficients [1−km(j)] and [km(j)] of the multipliers 51 and 53 become [(1/15)−j] and [(15−j)/15], respectively, a decoded luminance data and a decoded color data of the initial frame (j=0) after the start of the fade-out processing is output from the data synthesizer 54 as they are, while the decoded luminance data and the decoded color data of a subsequent j-th frame are mixed with the luminance data and the color data of the lyrics display data with a ratio [(15−j)/15], respectively, and output from the data synthesizer 54 (S62, S63, S37, S38).

By repeating the above mentioned procedures, the decoded luminance data and the decoded color data of the respective frames are mixed with the luminance data and the color data of the lyrics display data with ratios of 14/15, 13/15, 12/15, . . . in the order of frames after the start of the fade-in processing, respectively. Since the mixing ratio of the lyrics display data is gradually decreased, the picture on the screen of the monitor 2 which is displayed through the video signal processing circuit 39 and the NTSC/PAL encoder 41 and which has the luminance and the color of the lyrics display data is gradually changed to a picture which is reproduced picture of the decoded data of the file (Fs).

Although the lyrics display data as the video data for fading has been described as the monotone picture having a predetermined luminance and color in the first and second embodiments, the lyrics display data is not limited to such video data and it may be any other video data so long as a predetermined picture can be displayed therewith.

What is claimed is:

1. A picture switching device for use in a picture display system which selects one of a plurality of files recorded with coded video data, reads the video data from the selected file, decodes the read out coded video data and reproduces and displays said read out coded video data for switching a picture of a file which is currently being displayed to a picture of the selected file according to a selection instruction from an operating portion or a selection instruction which is a control data contained in a data stream of the video data, comprising:

data producing means for producing a video data for fading;

fade-out condition setting means for setting a fade-out time and a maximum mixing ratio of the video data for fading to the decoded video data;

data synthesizing means capable of summing the decoded video data and the video data for fading from the data producing means while changing a mixing ratio of the video data for fading to the decoded video data; and fade-out control means responsive to the selection instruction for controlling said data synthesizing means to gradually increase the data mixing ratio of said data synthesizing means from 0 to the maximum mixing ratio within the fade-out time set in said fade-out condition setting means.

2. A picture switching device for use in a picture display system which selects one of a plurality of files recorded with coded video data, reads the video data from the selected file, decodes the read out coded video data and reproduces and displays said read out coded video data for switching a picture of a file which is currently being displayed to a picture of the selected file according to a selection instruction from an operating portion or a selection instruction which is a control data contained in a data stream of the video data, comprising:

- data producing means for producing a video data for fading;
- fade-in condition setting means for setting a fade-in time and a maximum mixing ratio of the video data for fading to the decoded video data;
- data synthesizing means capable of summing the decoded video data and the video data for fading from said data producing means while changing a mixing ratio of the video data for fading to the decoded video data;
- detection means for determining whether or not a decoding of an initial frame data or field data of the coded video data of the file selected according to the selection instruction is completed; and
- fade-in control means for controlling said data synthesizing means to gradually decrease the data mixing ratio of said data synthesizing means from the maximum mixing ratio to 0 within the fade-in time set in said fade-in condition setting means when a completion of the decoding is detected by said detection means.

3. A picture switching device for use in a picture display system which selects one of a plurality of files recorded with coded video data, reads the video data from the selected file, decodes the read out coded video data and reproduces and displays said read out coded video data for switching a picture of a file which is currently being displayed to a picture of the selected file according to a selection instruction from an operating portion or a selection instruction which is a control data contained in a data stream of the video data, comprising:

- data producing means for producing a video data for fading;
- fade-out condition setting means for setting a fade-out time and a maximum mixing ratio of the video data for fading to the decoded video data;
- data synthesizing means capable of summing the decoded video data and the video data for fading from said data producing means while changing a mixing ratio of the video data for fading to the decoded video data;
- fade-out control means responsive to the selection instruction for controlling said data synthesizing means to gradually increase the data mixing ratio of said data synthesizing means from 0 to the maximum mixing ratio within the fade-out time set in said fade-out condition setting means;
- fade-in condition setting means for setting a fade-in time;
- detection means for determining whether or not a decoding of an initial frame data or field data of the coded video data of the file selected according to the selection instruction is completed; and
- fade-in control means for controlling said data synthesizing means to gradually decrease the data mixing ratio of said data synthesizing means from the maximum mixing ratio controlled by said fade-out control means to 0 within the fade-in time set in said fade-in condition setting means when a completion of the decoding is detected by said detection means.

* * * * *